United States Patent
Samara et al.

(10) Patent No.: US 7,212,661 B2
(45) Date of Patent: May 1, 2007

(54) IMAGE DATA NAVIGATION METHOD AND APPARATUS

(75) Inventors: Yaseen Samara, Palo Alto, CA (US); Prakash Parayll Mathew, Wheaton, IL (US); Vijaykalyan Yeluri, Sunnyvale, CA (US); Denny Wingchung Lau, Mountain View, CA (US); William Murray Stoval, III, Prospect, IL (US); Christopher Frederick Beaulieu, Los Altos, CA (US)

(73) Assignee: GE Medical Systems Information Technologies. Inc., Milwaukee, WI (US)

( * ) Notice: Subject to any disclaimer, the term of this patent is extended or adjusted under 35 U.S.C. 154(b) by 874 days.

(21) Appl. No.: 10/367,421

(22) Filed: Feb. 14, 2003

(65) Prior Publication Data
US 2004/0161139 A1 Aug. 19, 2004

(51) Int. Cl.
*G06K 9/00* (2006.01)
(52) U.S. Cl. ........................ 382/131; 600/407; 600/410
(58) Field of Classification Search ................ 382/128, 382/129, 130, 131, 134, 132, 133; 600/410, 600/419, 420, 431, 433, 481, 407, 425, 488; 128/920, 922; 378/6, 29, 98, 46, 90, 92, 378/98.4, 98.6, 98.9, 101, 140
See application file for complete search history.

(56) References Cited

U.S. PATENT DOCUMENTS

| | | | | |
|---|---|---|---|---|
| 5,274,551 A | * | 12/1993 | Corby, Jr. | .................... 600/433 |
| 6,369,812 B1 | * | 4/2002 | Iyriboz et al. | .............. 345/419 |
| 6,823,207 B1 | * | 11/2004 | Jensen et al. | ............... 600/427 |

* cited by examiner

*Primary Examiner*—Jingge Wu
*Assistant Examiner*—Abolfazl Tabatabai
(74) *Attorney, Agent, or Firm*—Fletcher Yoder

(57) ABSTRACT

A technique is provided for generating scout or navigational images based upon a series of related images. The related images are analyzed to compute pixels of scout images, such as by determining a characteristic of aligned pixels of each of the related images. The scout or navigational images are then projections of the related images and individual rows or columns of the scout images correspond to individual images of the related set. One or more of the related images may then be accessed by review of the scout image or images. The scout images may be referred to in their own right for an overview of features of interest and may be modified by a user. The technique provides for efficient time management by allowing specific images to be identified in large image series, and facilitates intelligent use of bandwidth for accessing specific images in a viewer workstation.

51 Claims, 7 Drawing Sheets

IMAGE DATA NAVIGATION METHOD AND APPARATUS

BACKGROUND OF THE INVENTION

The present invention relates generally to imaging systems, and more particularly to techniques for reconstructing scout or navigational images from a series of images, such as in a medical context, for use in identifying and examining specific images on which the navigational image is based, specific features within the images, and so forth.

In a field of imaging systems, and particularly in the medical imaging field, a wide range of techniques are employed for generating image data. In medical imaging, for example, various modalities serve to generate image data based upon specific physical properties of materials and their interaction with imaging systems. Such modalities include computed tomography (CT) systems, X-ray systems, magnetic resonance imaging (MRI) systems, positron emission tomography (PET) systems, ultrasound systems, and so forth. These systems are generally designed to collect image data in response to various radiation, stimuli or signal sources within a subject. The signals can then be filtered and manipulated to form a dataset from which a reconstructed image may be generated. It should be noted that while reference is made throughout the present discussion of modalities employed in the medical imaging field, these same and other modalities may be employed in a wide range of other fields, including baggage processing, human and non-human screening, seismography, meteorology, and so forth.

In certain imaging modalities a large datasets are generated which can be used to reconstruct a large number of images. For example, in CT imaging a source of X-ray radiation is rotated about a subject opposite a detector. As X-rays penetrate the subject at various angles of rotation, the detector generates resulting signals which are representative of the impacting radiation, attenuated or absorbed by various tissues within a subject. In a helical mode a table on which the subject is positioned is advanced through the scanner, resulting in a very large dataset which can then serve for reconstruction of many images or virtual slices through the subject.

With the advent of 8 and 16-slice CT scanners, the number of images acquired in a scanning sequence has increased dramatically. In previous systems, a study or examination sequence may have included some 100–200 images on the average. Such numbers are relatively manageable for a technician or radiologist, who must navigate through and inspect many images visually using various types of displays, such as stacked mode displays and cine displays. Such displays allow the viewer to view individual images sequentially on a viewer. With high-resolution acquisition hardware, studies with image counts in excess of 2000 are becoming routine, however. Even greater numbers may be obtainable in the future. Given the workload and productivity demands, and time pressures on radiologists, navigating through large image sets is no longer a trivial problem, simply due to the time required to page through such large numbers of images.

A further difficulty in managing large image sets arises from the sheer volume of the data involved in each study. Large image datasets are typically stored in digital form in a picture archive communications system or PACS, or some other digital storage medium. For viewing, the images of interest are typically then loaded from the PACS to a diagnostic workstation. Large datasets require significant bandwidth and result in significant delay in the transfer from the PACS archive to the diagnostic workstation, however. For large studies, a radiologist may not require all images, but, at present, there is no enhanced method for locating which images may be of interest in a study. Current approaches may include techniques for minimizing the time required to display a first image. However, such techniques do not actually address the need to navigate through the collection of images for features of interest.

In one current mode of navigation through large datasets, images are selected at particular locations, such as inferior or superior locations, typically corresponding to the foot and head, respectively, in the case of full body CT image datasets. From the selected location, images are traversed sequentially on an image-by-image basis through the entire dataset. This method is particularly challenging the radiologist, especially in the case of large image datasets where many images must be accessed and displayed for such traversing. While certain acquired images may be used for relatively crude scouting purposes, such as initial scout images which may be acquired in CT applications, the images are not an accurate mechanism to cross-reference to the large series of images which are subsequently acquired and which are not directly related to the earlier scout image data.

There is a need, therefore, for an improved technique for navigating through large image datasets. The technique would advantageously provide a reliable tool for identifying features of interest in specific applications, and for identifying specific image or sets of images in which the features may be viewed in greater detail.

BRIEF DESCRIPTION OF THE INVENTION

The present technique provides a novel method for deriving scout or navigational images designed to respond to such needs. In accordance with one aspect of the technique, a method is provided for processing a series of images. The method includes accessing image data representative of a plurality of related images. A navigational image is then derived by computing values for pixels of a navigational image that represent a projection of the related image in a desired direction. The navigational image is then stored for future reference.

In accordance with another aspect of the technique, image data representative of a plurality of related images is accessed, and a navigational image is derived from the related images that is a projection of the related images in a desired direction. The navigational image is derived by computing a representative value for each pixel of the navigational image based upon characteristics of corresponding pixels aligned orthogonally to the desired direction in each of the plurality of related images. The navigational images are then stored.

In accordance with a further aspect of the technique, image data is accessed that is representative of a plurality of related images, and a navigational images derived by computing representative values for pixels of the navigational image. The navigational image is then stored, and later displayed for a user. A selection is then received from the user of a location on the navigational image and at least one image of the plurality of related images is accessed and displayed based upon the selection.

The present technique also provides a system for generating and using scout and navigational images as mentioned above, as well as a computer program for generating and using such images.

DETAILED DESCRIPTION OF SPECIFIC EMBODIMENTS

Figure 1:
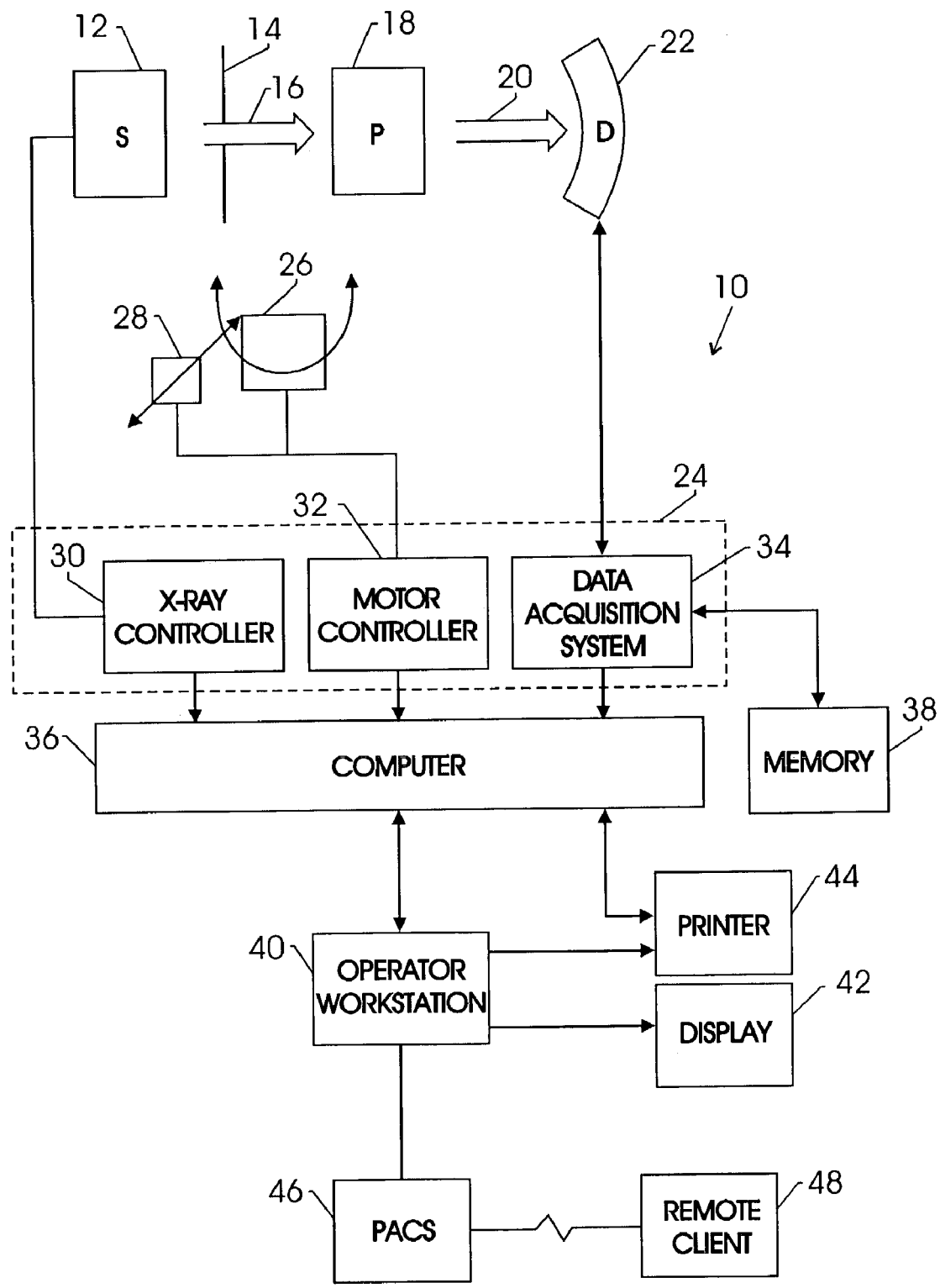
FIG. 1 is a diagrammatical view of an exemplary imaging system, in the form of a CT imaging system, for use in producing image data for which navigational images may be generated in accordance with aspects of the present technique.

FIG. 1 illustrates diagrammatically an imaging system 10 for acquiring and processing image data for which navigational images may be generated, as described in detail below. In the illustrated embodiment, system 10 is a computed tomography (CT) system designed both to acquire original image data, and to process the image data for display and analysis while the CT system 10 is described herein as one source of image data for which navigational images may be generated, it should be borne in mind that other imaging modalities may be employed as well, such as MRI systems, X-ray systems, ultrasound systems, PET systems, and so forth.

In the embodiment illustrated in FIG. 1, imaging system 10 includes a source of X-ray radiation 12 positioned adjacent to a collimator 14. In this exemplary embodiment, the source of X-ray radiation source 12 is typically an X-ray tube. Collimator 14 permits a stream of radiation 16 to pass into a region in which a subject, such as a human patient 18 is positioned. A portion of the radiation 20 passes through or around the subject and impacts a detector array, represented generally at reference numeral 22. Detector elements of the array produce electrical signals that represent the intensity of the incident X-ray beam. These signals are acquired and processed to reconstruct an image of the features within the subject.

Source 12 is controlled by a system controller 24, which furnishes both power and control signals for CT examination sequences. Moreover, detector 22 is coupled to the system controller 24, which commands acquisition of the signals generated in the detector 22. The system controller 24 may also execute various signal processing and filtration functions, such as for initial adjustment of dynamic ranges, interleaving of digital image data, and so forth. In general, system controller 24 commands operation of the imaging system to execute examination protocols and to process acquired data. In the present context, system controller 24 also includes signal processing circuitry, typically based upon a general purpose or application-specific digital computer, associated memory circuitry for storing programs and routines executed by the computer, as well as configuration parameters and image data, interface circuits, and so forth.

In the embodiment illustrated in FIG. 1, system controller 24 is coupled to a linear positioning subsystem 26 and rotational subsystem 28. The rotational subsystem 28 enables the X-ray source 12, collimator 14 and the detector 22 to be rotated one or multiple turns around the patient 18. It should be noted that the rotational subsystem 28 might include a gantry. Thus, the system controller 24 may be utilized to operate the gantry. The linear positioning subsystem 26 enables the patient 18, or more specifically a patient table, to be displaced linearly. Thus, the patient table may be linearly moved within the gantry to generate images of particular areas of the patient 18.

Additionally, as will be appreciated by those skilled in the art, the source of radiation may be controlled by an X-ray controller 30 disposed within the system controller 24. Particularly, the X-ray controller 30 is configured to provide power and timing signals to the X-ray source 12. A motor controller 32 may be utilized to control the movement of the rotational subsystem 28 and the linear positioning subsystem 26.

Further, the system controller 24 is also illustrated comprising a data acquisition system 34. In this exemplary embodiment, the detector 22 is coupled to the system controller 24, and more particularly to the data acquisition system 34. The data acquisition system 34 receives data collected by readout electronics of the detector 22. The data acquisition system 34 typically receives sampled analog signals from the detector 22 and converts the data to digital signals for subsequent processing by a computer 36.

The computer 36 is typically coupled to the system controller 24. The data collected by the data acquisition system 34 may be transmitted to the computer 36 and moreover, to a memory 38. It should be understood that any type of memory to store a large amount of data might be utilized by such an exemplary system 10. Moreover, the memory 38 may be located at this acquisition system or may include remote components for storing data, processing parameters, and routines described below. Also the computer 36 is configured to receive commands and scanning parameters from an operator via an operator workstation 40 typically equipped with a keyboard and other input devices. An operator may control the system 10 via the input devices. Thus, the operator may observe the reconstructed image and other data relevant to the system from computer 36, initiate imaging, and so forth.

A display 42 coupled to the operator workstation 40 may be utilized to observe the reconstructed image and to control imaging. Additionally, the scanned image may also be printed by a printer 44 which may be coupled to the operator workstation 40. The display 42 and printer 44 may also be connected to the computer 36, either directly or via the operator workstation 40. Further, the operator workstation 40 may also be coupled to a picture archive and communications system (PACS) 46. It should be noted that PACS 46 might be coupled to a remote system 48, radiology department information system (RIS), hospital information system (HIS) or to an internal or external network, so that others at different locations may gain access to the image and to the image data. Additional components and functions of the PACS are set forth below.

It should be further noted that the computer 36 and operator workstation 40 may be coupled to other output devices, which may include standard, or special purpose computer monitors and associated processing circuitry. One or more operator workstations 40 may be further linked in the system for outputting system parameters, requesting examinations, viewing images, and so forth. In general, displays, printers, workstations, and similar devices supplied within the system may be local to the data acquisition components, or may be remote from these components, such as elsewhere within an institution or hospital, or in an entirely different location, linked to the image acquisition system via one or more configurable networks, such as the Internet, virtual private networks, and so forth.

Figure 2:
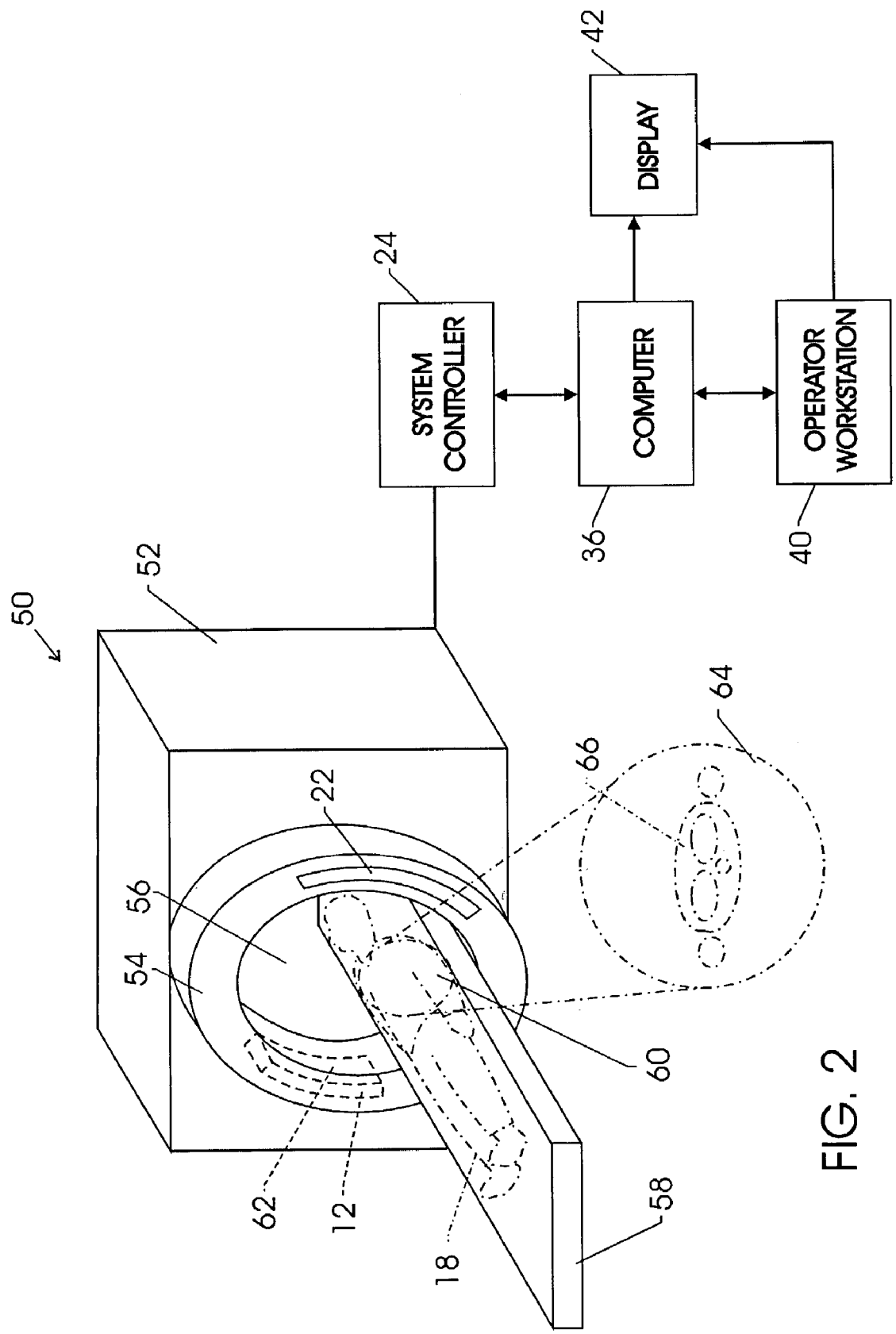
FIG. 2 is another diagrammatical view of a physical implementation of the CT system of FIG. 1.

Referring generally to FIG. 2, the exemplary imaging system of FIG. 1 is illustrated in a form typically used to generate medical images. The CT scanning system 50 is typically a multi-slice detector CT (MDCT) system that offers a wide array of axial coverage, high gantry rotational speed, and high spatial resolution, all of which allow the use of sophisticated image reconstruction algorithms. The CT scanning system 50 is illustrated as including a frame 52 and a gantry 54 with an aperture 56. The aperture 56 may typically be 50 cm in diameter. Further, a patient table 58 is illustrated positioned in the aperture 56 of the frame 52 and the gantry 54. The patient table 58 is adapted so that a patient 18 may recline comfortably during the examination process. Additionally, the patient table 58 is configured to be displaced linearly by the linear positioning subsystem 26 (see FIG. 1). The gantry 54 is illustrated with the source of radiation 12, typically an X-ray tube that emits X-ray radiation from a focal point 62.

In typical operation, X-ray source 12 projects an X-ray beam from the focal point 62 and toward detector array 22. The detector 22 is generally formed by a plurality of detector elements, which sense the X-rays that pass through and around the subject. Each detector element produces an electrical signal that represents the intensity of the X-ray beam at the position of the element at the time the beam strikes the detector. Furthermore, the gantry 54 is rotated around the subject of interest so that a plurality of radiographic views may be collected by the computer 36. Thus, an image or slice is computed which may incorporate, in certain modes, less or more than 360 degrees of projection data, to formulate an image. The image is collimated to desired dimensions, typically less than 40 mm thick using either lead shutters in front of the X-ray source 12 and different detector apertures. The collimator 14 (see FIG. 1) typically defines the size and shape of the X-ray beam that emerges from the X-ray source 12.

Thus, as the X-ray source 12 and the detector 22 rotate, the detector 22 collects data of the attenuated X-ray beams. Data collected from the detector 22 then undergoes pre-processing and calibration to condition the data to represent the line integrals of the attenuation coefficients of the scanned objects. The processed data, commonly called projections, are then filtered and backprojected to formulate an image of the scanned area. As mentioned above, the computer 36 is typically used to control the entire CT system 10 (see FIG. 1). The main computer that controls the operation of the system may be adapted to control features enabled by the system controller 24. Further, the operator workstation 40 is coupled to the computer 36 as well as to a display, so that the reconstructed image may be viewed. Alternatively, some or all of the processing described herein may be performed remotely by additional computing resources based upon raw or partially processed image data.

The system 10 (see FIG. 1) thus generates multiple images from acquired image data. Each reconstructed image corresponds to a slice 60 which, when cast in pixilated format, becomes a separate image related to other images sequentially in the imaged volume. For each image 60, then, within an image area or field of view 64, certain features of interest 66 will be visible.

As will be appreciated by those skilled in the art, the CT system acquires data continuously, although at discrete image view frames corresponding to specific angular positions, as the source and detector rotate about the subject. Moreover, in helical modes of operation, the data are collected as the subject is displaced by movement of the table. The resulting data set contains a large quantity of data points representative of the intensity of radiation impacting elements of the detector at each of the angular positions. Reconstruction of images proceeds by selecting desired "reconstruction windows" or spans of data points which, based upon the reconstruction algorithm employed, provide sufficient information to calculate locations of features causing X-ray attenuation. Such reconstruction techniques may employ windows spanning all 360° of angular positions, but for reasons of computational efficiency and to reduce the incidence of motion-induced artifacts, reconstruction algorithms generally rely upon windows spanning 180° plus the included angle of the X-ray beam (typically referred to as the fan angle or "α"). Due to redundancy in the data, such reconstruction windows generally suffice for image reconstruction and provide improved temporal resolution. Other techniques may employ a combination of data acquired during a plurality of shorter windows, such as in techniques referred to as multi-sector reconstruction.

Following image data acquisition, processing in reconstruction, a large number of images will typically be created that can be reviewed by radiologists and other clinicians to identify possible features of interest. In a medical context, these features of interest may include anatomical regions, tissues, organs, anomalies that could be indicative to disease states, and so forth. In certain modes of operation, the imaging system 10 (See FIG. 1) may produce hundreds or thousands of images. The present technique provides a mechanism for assisting in navigating through such large image sets and for identifying specific regions or features of interest in the image sets such that specific images or sets of images can be reviewed. The technique makes use of a navigational image which may be referred to as a scout image for such navigation. It should be understood, however, in the present context the term "scout" is not to be confused with conventional scout images generated prior to CT data acquisition. In the present context, the navigational or scout images are generated from the acquired image data and may be stored along with the original images, such as in a secondary capture operation. The navigational images are then viewed by the radiologist or clinician to identify which particular images may include the particular features of interest. The navigational images may also provide a general overview of certain anatomical systems or tissues which may, in and of themselves, be useful for clinical purposes.

Figure 3:
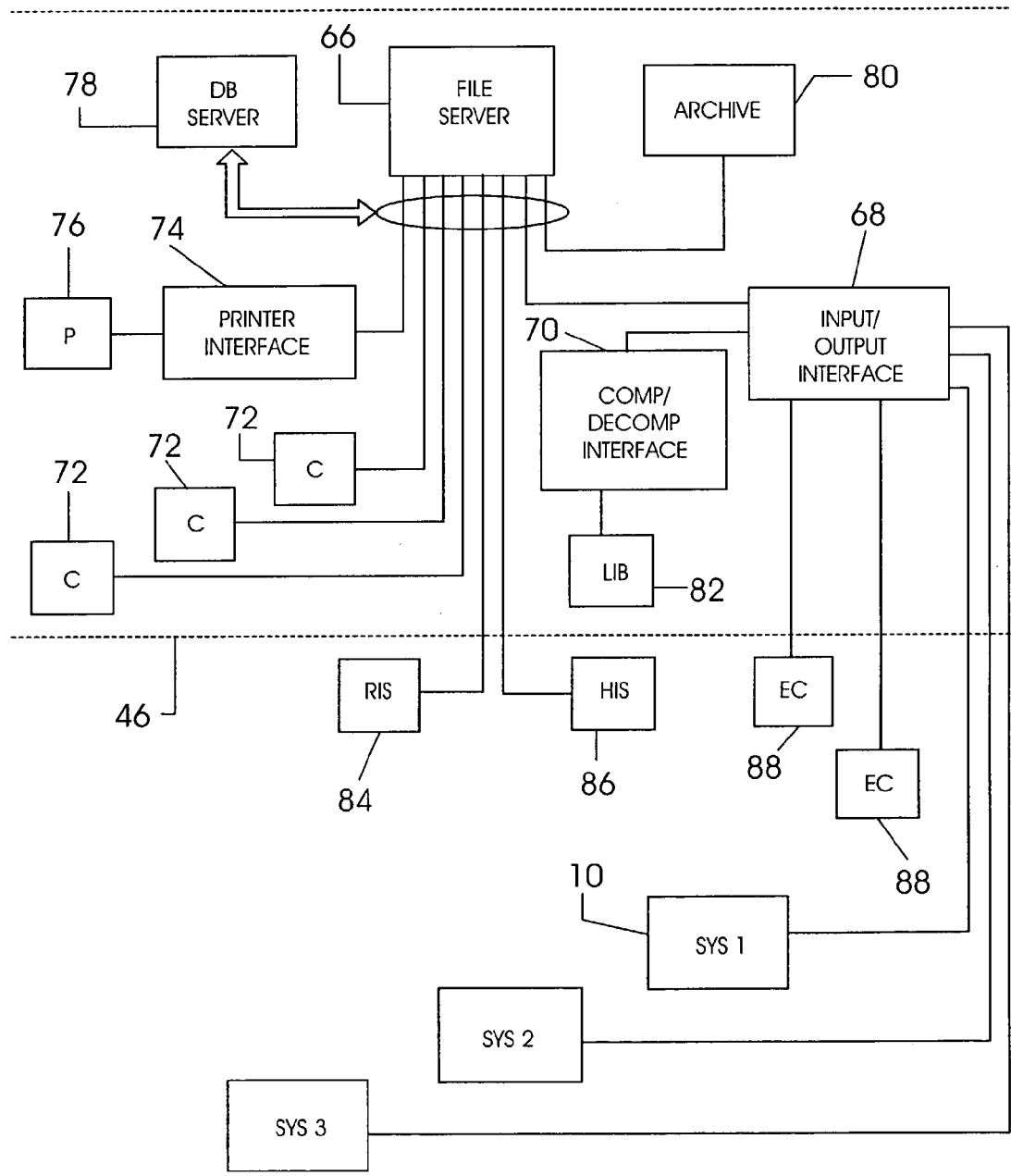
FIG. 3 is a diagrammatical representation of an exemplary image management system, in the illustrated example a picture archive and communications system or PACS, for receiving and storing image data in accordance with certain aspects of the present technique.

As noted above, the images generated by the system are typically stored in a PACS 46 (refer to FIG. 1). FIG. 3 illustrates an exemplary PACS 46 for receiving, storing and providing access to image data. In the illustrated embodiment, PACS 46 receives image data from several separate imaging systems, including system 10. PACS 46 includes one or more file servers 66 designed to receive and process image data, and to make the image data available for review. Server 66 receives the image data through an input/output interface 68. Image data may be compressed in routines accessed through a compression/decompression interface 70. In a typical system, interface 70 serves to compress the incoming image data rapidly and optimally, while maintaining descriptive image data available for reference by server 66 and other components of the PACS. Where desired, interface 70 may also serve to decompress image data accessed through the server. Compression of the data at the interface 70 may allow more data to be stored on the system 46 or may allow data to be transmitted more rapidly and efficiently to sites on the network which may also be configured to decompress the compressed data.

The server is also coupled to internal clients, as indicated at reference numeral 72, each client typically including a work station at which a radiologist, physician, or clinician may access image data from the server, decompress the image data, and view or output the image data as desired. Clients 72 may also input information, such as dictation of a radiologist following review of examination sequences. Similarly, server 66 may be coupled to one or more interfaces, such as a printer interface 74 designed to access and decompress image data, and to output hard copy images via a printer 76 or other peripheral.

A database server 78 may associate image data, and other work flow information within the PACS by reference to one or more file servers 66. In a presently contemplated embodiment, database server 78 may include cross-referenced information regarding specific image sequences, referring or diagnosing physician information, patient information, background information, work list cross-references, and so forth. The information within database server 78 serves to facilitate storage and association of the image data files with one another, and to allow requesting clients to rapidly and accurately access image data files stored within the system. Similarly, server 66 is coupled to one or more archives 80, such as an optical storage system, which serve as repositories of large volumes of image data for backup and archiving purposes. Techniques for transferring image data between server 66, and any memory associated with server 66 forming a short term storage system, and archive 80, may follow any suitable data management scheme, such as to archive image data following review and dictation by a radiologist, or after a sufficient time has lapsed since the receipt or review of the image files.

In the illustrated embodiment, other components of the PACS system or institution may be integrated with the foregoing components to further enhance the system functionality. For example, as illustrated in FIG. 3, a compression/decompression library 82 is coupled to interface 70 and serves to store compression routines, algorithms, look up tables, and so forth, for access by interface 70 (or other system components) upon execution of compression and decompression routines (i.e. to store various routines, software versions, code tables, and so forth). In practice, interface 70 may be part of library 82. Library 82 may also be coupled to other components of the system, such as client stations 72 or printer interface 74, which may also be configured to compress or decompress data, serving similarly as a library or store for the compression and decompression routines and algorithms. Although illustrated as a separate component in FIG. 3, it should be understood that library 82 may be included in any suitable server or memory device, including within server 66. Moreover, code defining the compression and decompression processes described below may be loaded directly into interface 70 and/or library 82, or may be loaded or updated via network links, including wide area networks, open networks, and so forth.

Additional systems may be linked to the PACS, such as directly to server 78, or through interfaces such as interface 68. In the embodiment illustrated in FIG. 3, a radiology department information system or RIS 84 is linked to server 66 to facilitate exchanges of data, typically cross-referencing data within database server 78, and a central or departmental information system or database. Similarly, a hospital information system or HIS 86 may be coupled to server 78 to similarly exchange database information, workflow information, and so forth. Where desired, such systems may be interfaced through data exchange software, or may be partially or fully integrated with the PACS system to provide access to data between the PACS database and radiology department or hospital databases, or to provide a single cross-referencing database. Similarly, external clients, as designated at reference numeral 88, may be interfaced with the PACS to enable images to be viewed at remote locations. Such external clients may employ decompression software, or may receive image files already decompressed by interface 70. Again, links to such external clients may be made through any suitable connection, such as wide area networks, virtual private networks, and so forth.

As mentioned above, the large series of images that can be created and stored for a particular examination or study may be extremely difficult to navigate. That is, a clinician or radiologist charged with reviewing the images for diagnosis, treatment or other reasons may, in conventional systems, need to page through a vast number of images to identify potential features of interest. In addition, the images must be transmitted from the repository on which they are stored to a workstation where the clinician or radiologist may view the reconstructed images. The present technique provides for generating and storing navigational or scout images which can be used to facilitate identification of one or more images in a large series which may be of particular interest.

Figure 4:
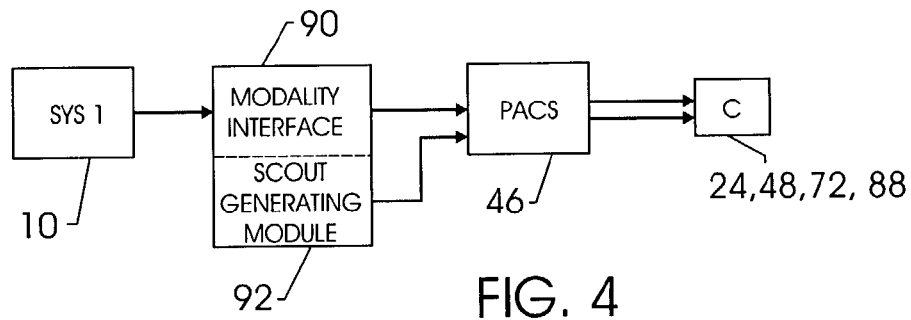
FIG. 4 is a diagrammatical representation of exemplary functional components in a system for acquiring and displaying images that includes a scout or navigational image generating module.

FIG. 4 illustrates exemplary components of a system for generating such scout images in conjunction with conventional image data acquisition systems 10 (see FIG. 10) and PACS 46. Again, it should be noted that the present techniques can be applied to a wide range of imaging modalities and, indeed, to a wide range of image types and problems. The present description again focuses on medical imaging applications and more particularly upon CT modalities. However, other applications, fields of use, and imaging modalities may be serviced through the same techniques.

In the diagram of FIG. 4, a modality interface 90 is shown between an imaging system 10 and a PACS 46. The imaging interface may serve several functions, but in the present embodiment particularly includes a scout generating module 92. The modality interface receives either raw, partially processed or processed data from the system 10 and further processes the data to generate the scout used to navigate through the large image series. Both the image series and the scout image or images are then conveyed to the PACS, with the scout image or images preferably being saved as a secondary image capture to the exam image series. The PACS 46 may then serve both the scout image or images and the images in the series to the client workstation 24, 48, 72, 88. It should be noted, as discussed in greater detail below, that this workflow offered by the present technique affords a number of important benefits. For example, the scout image or images can be provided to the client workstation in a very efficient manner without the need to access and transfer a large number of images for navigational purposes.

Upon selection of one or more images of interest from the scout image or images, then, the system may forward to the client workstation only those images which are believed to be of particular interest for the features to be viewed. It should also be noted that, depending upon the system design, the interface 90 may be either a separate component, or may be integrated into the modality system or into the PACS 46.

Figure 5:
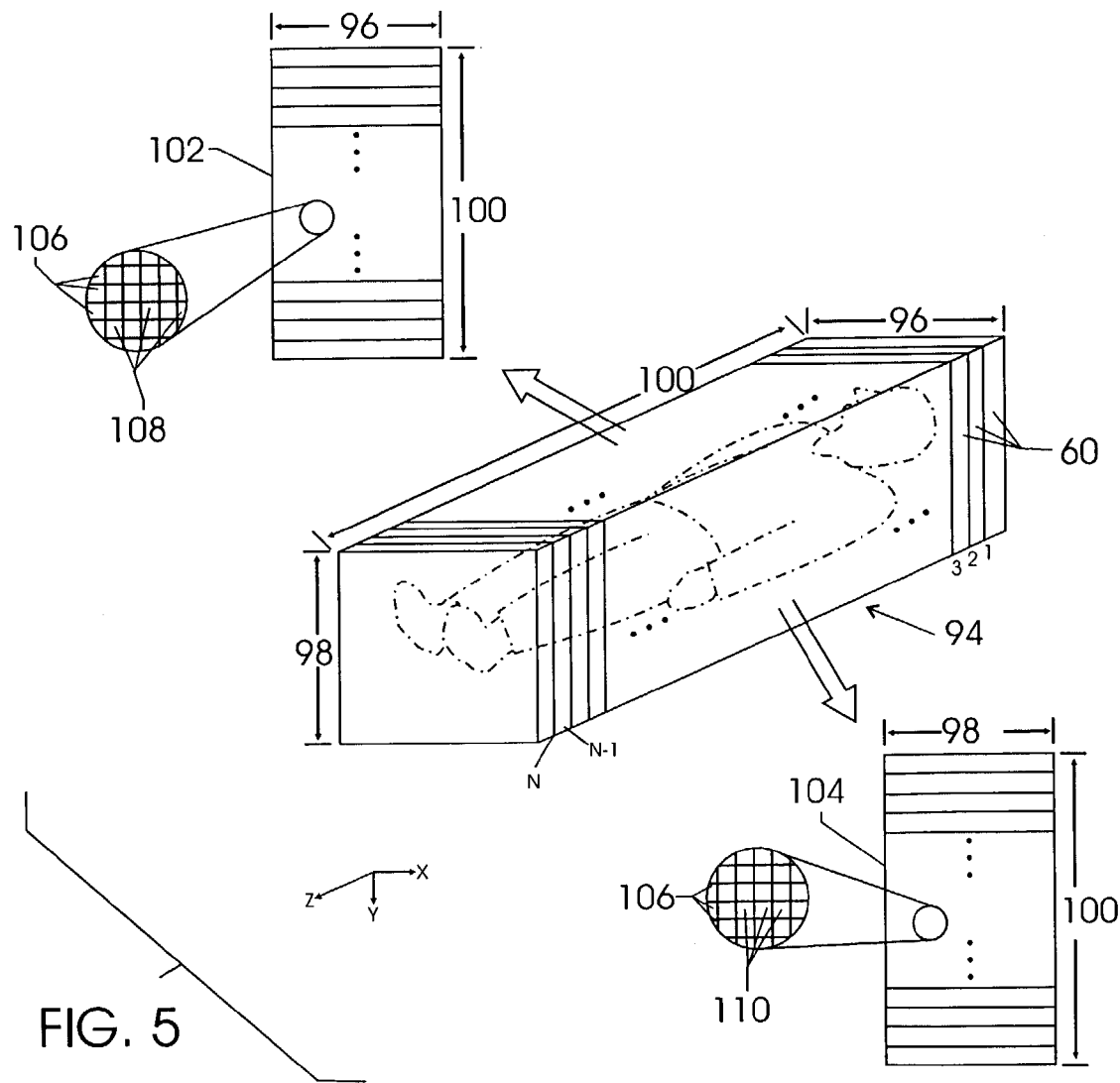
FIG. 5 is a representation of a series of related images with scout or navigational images generated by analysis of the related images.

FIG. 5 illustrates a series of images and two exemplary types of scout or navigational images which can be generated from the series of images in accordance with aspects of the present technique. In particular, an image set 94 comprises a number of separate images or slices 60 which may be conceptually represented as stacked over the volume covered by the image series. For example, in certain CT imaging modes, between 2000 and 5000 such slices may be available for reconstruction. The slices 60 may be thought of as stacked, therefore, and may be numbered as illustrated in FIG. 5 from 1 to N. As will be appreciated by those skilled in the art, each slice comprises rows and columns of individual picture elements or pixels corresponding to individual volume element or voxels in the imaged volume. Each pixel will typically be represented in the data as an intensity over a potential dynamic range. Dynamic ranges for pixel intensities commonly vary from $2^8$ to $2^{16}$ incremental values. In the embodiment illustrated in FIG. 5, the imaging volume has a width 96, a height 98 and a length 100. In practice, width 96 generally corresponds to the number of columns in the individual slice images, while the height 98 corresponds to the number of rows in the slice images. Thus, each image in the volume would have dimensions corresponding to the width 96 and height 98, commonly on the order of 512×512 pixels or larger. The length 100 corresponds to the number of individual slices 60.

As illustrated in the inset of FIG. 5, a coordinate system may be established along axes X, Y, Z which generally correspond to width 96, height 98 and length 100. The present technique provides for generating various types of scout or navigational images in at least two of these directions. As shown by the insets in FIG. 5, for example, a coronal scout or navigational image 102 may be generated from the images comprising the volume to provide a scout image having dimensions 96 and 100, generally corresponding to the pixel width of the individual slices and the number of slices in the imaging volume. Similarly, a sagittal scout or navigational image 104 may be generated having a width corresponding to height 98 or the pixel height of the imaging volume, and a length 100 corresponding to the number of slices in the volume.

It should be noted that, as described in more detail below, by the present techniques, the scout images can be generated such that rows 106 in the images generally correspond to slices 60 of the imaging volume in the image set 94. This is true of both the coronal and sagittal scout images. It should also be noted that individual pixels 108 of the coronal scout 102 correspond to filtered values for columns of pixels in each individual slice. On the other hand, individual pixels 110 in the sagittal scout image 104 corresponds to filtered values of rows of each slice in the imaging volume of the image set 94. As will be appreciated by those skilled in the art, then, individual slices or groups of slices corresponding to individual images or groups of images may be selected from the scout images for further viewing as described below.

Figure 6:
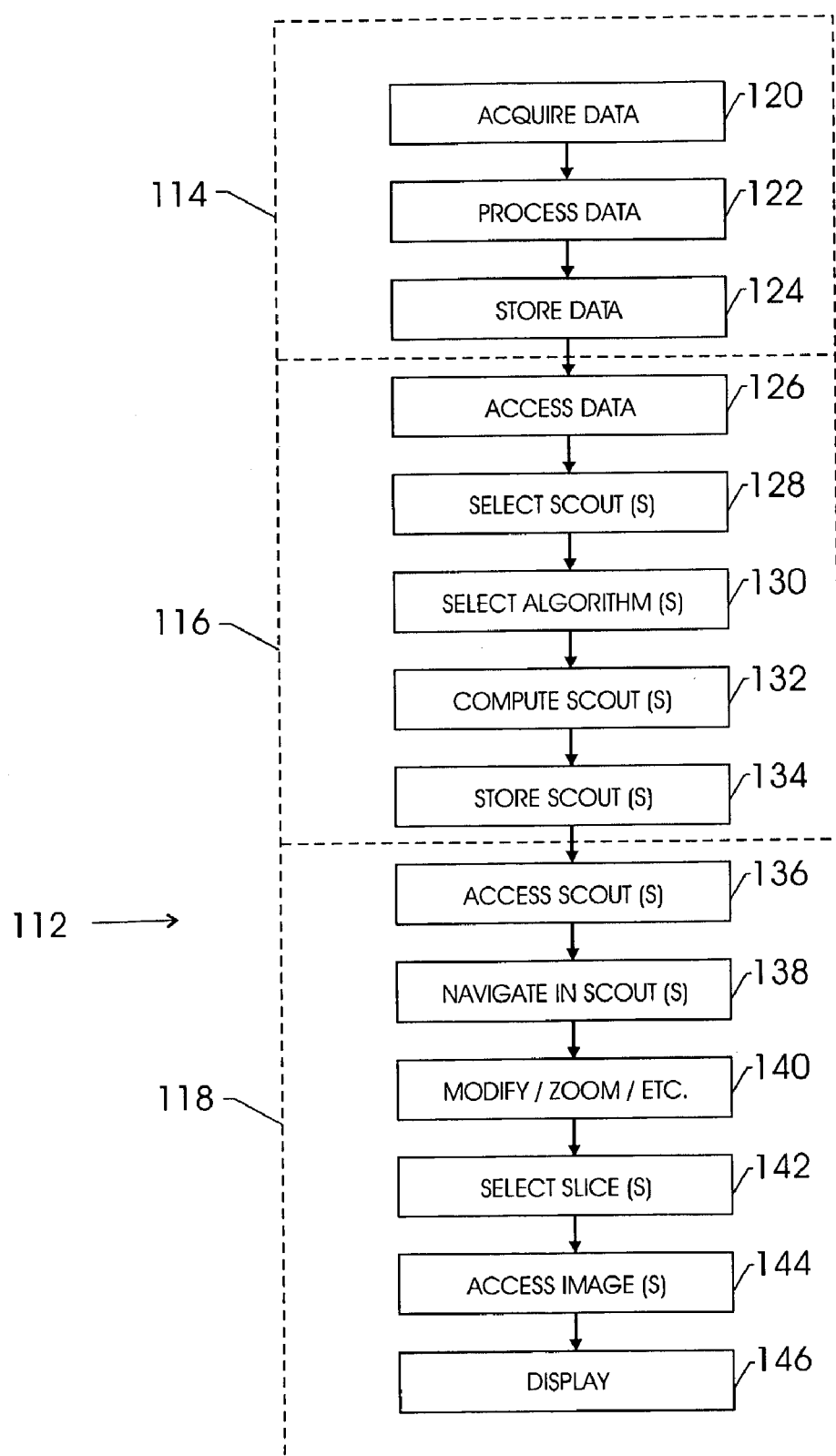
FIG. 6 is a flow chart illustrating exemplary steps for acquiring, processing and viewing images by means of scout or navigational images.

Several filter types may be employed for generating the scout images, depending upon such factors as the nature of the image data, the modality from which the data originated, the features of interest in the data, anticipated anatomies to be pinpointed and viewed, and so forth. FIG. 6 represents a series of exemplary steps logic for acquiring, processing and utilizing image data including the scout image data in accordance with a present embodiment. The process, designated generally by reference numeral 112 in FIG. 6 may be considered in three general phases, including a data acquisition phase 114, a scout image generation phase 116 and a scout image navigation or utilization phase 118.

As noted above, the data acquisition phase 114 consists of various steps for data acquisition processing and storage. The data acquisition step 120 will vary depending upon the nature of the acquisition system. In the example provided above, for example, image data may be collected in a CT system based upon various system and user-provided parameters. The resulting image data is then processed as indicated at step 122 in FIG. 6. The processing may, as will be appreciated by those skilled in the art, include filtering of data, adjustment of dynamic ranges, selection of reconstruction windows, formatting of data files, and so forth. These steps will also typically vary from modality to modality and may vary within a specific modality depending upon the system settings, the features of interest to be viewed or analyzed, and so forth. At step 124 in FIG. 6 the image data is stored. As noted above, in a present embodiment, data for a large series of images associated with one another is stored in a PACS. Other storage means and schemes may, of course, be envisaged. Moreover, storage may take place locally at an imaging system or within a device, or remotely as desired.

The scout image generation phase 116 includes steps for accessing the image data and generating one or more scout images that can be used to view relationships between the various individual images and for navigational purposes as described more fully below. As represented in FIG. 6, phase 116 may include steps of accessing image data, as indicated at reference numeral 126. Such accessing may be performed in real time as image data is collected, so as to produce a scout image virtually simultaneously with the image data acquisition. However, access to the data may be performed subsequently based upon stored raw or processed data. At step 128 in FIG. 6 one or more desired scout images may be selected. While all available scout images may be computed, it is possible to provide the user with the ability to select one or more types of images. Thus, the full coronal or sagittal images described above may be computed for all related images in the series, or only certain of these images may be created by default. User selections may also be made based upon the preferences of specific users or based upon specific image types or anatomies to be viewed in the images.

Similarly, at step 130 in FIG. 6, one or more algorithms for generating the scout images may be selected. As summarized below, several different approaches may be employed for generating the scout images. These may depend upon such factors as the specific anatomies to be viewed, the characteristics of the data comprising the related images, and so forth. In a present embodiment, the algorithms may be based upon specific tissue types or diagnostic purposes. As with the selection of the scout images themselves, implementation may call for utilization of all available algorithms for generation of corresponding scouts. Alternatively, certain algorithms may be employed as a default or the algorithms may be selectable by a user. Also, such algorithms may be selected based upon user preferences, or may be automatically selected, such as based upon information available from the image data itself. Certain such information is typically stored in the DICOM header of medical diagnostic images.

At step 132 in FIG. 6 the scout image data itself is computed. As noted above, several different scout images may be formulated, and the image data for reconstruction of the scout image may be computed based upon different algorithms.

In a present embodiment, the scout image includes pixels in rows and columns with values of each pixel being calculated based upon values of aligned pixels in each of the related images. Referring, for example, to FIG. 5, for the coronal scout image 102, individual pixels are computed based upon pixels of the related slice images aligned in the Y direction. That is, the coronal image 102 is effectively a projection of edges of the related images in the plane of the coronal image. Accordingly, rows 106 of the coronal image 102 correspond to individual images 60 of the related set of images, while each pixel within each row corresponds to a filtered value based upon the pixel values of the individual images aligned in the Y direction. Similarly, as represented in FIG. 5, the sagittal image 104 includes rows 106 which also correspond to the individual images 60. However, pixels 110 of image 104 are computed based upon values of pixels of each individual image in the related set of images aligned in the X direction.

The particular algorithm used to compute the individual pixels of the scout images may vary and a number of such algorithms may be developed. In a present embodiment, for example, three algorithms are employed in accordance with three separate protocols. In a first algorithm, used for an angiography protocol, each pixel in the scout image corresponds to the maximum value of any of the aligned pixels analyzed for determining the respective scout image pixel. That is, in the example of the coronal image 102 in FIG. 5, each pixel 108 of the scout image is assigned a value equal to the maximum value of any aligned pixel in a column of one of the related images in the Y direction. As will be appreciated by those skilled in the art, such values are typically representative of a brightness or intensity of the corresponding pixel when displayed. In another algorithm, corresponding to a colonoscopy protocol, each pixel 108 of the coronal image 102 is assigned a value equal to the minimum value of any pixel aligned in the Y direction at a corresponding location of one of the related images. Finally, in a third algorithm, which may be referred to as a bone protocol, each pixel 108 in the coronal image 102 is assigned a value that is an average of the aligned pixels in the Y direction. As will be appreciated by those skilled in the art, similar processing is performed for the sagittal scout image 104, with each of the individual pixels 110 corresponding to the maximum, minimum or average value for pixels aligned in the X direction in the representation of FIG. 5. As noted above, other algorithms may, of course, be envisaged, including algorithms based upon statistical analysis of pixel values, weighted averages, and so forth.

Returning to FIG. 6, once the desired scout images are computed, the images are stored at step 134. In the medical diagnostic context, the scout images are preferably stored as a secondary image capture of the examination that produced the related images. Thus, as summarized below, the scout or navigational images can be accessed and viewed to rapidly recognize which image or images are of particular interest for diagnostic or analysis purposes.

Phase 118 summarized in FIG. 6, which constitutes the actual utilization of the scout or navigational images, begins with step 136 in which the scout image or images are retrieved from the repository. In a typical implementation in the medical diagnostics context, for example, the scout images will be loaded on a workstation for viewing by a clinician or radiologist. The images themselves may be of particular interest for viewing overall anatomies or features of interest. Moreover, the images permit rapid identification of areas for which individual images may be of particular interest. Thus, at step 138 in FIG. 6, one or more of the scout images may be navigated to identify one or more individual images which can be accessed and loaded for review.

Figure 7:
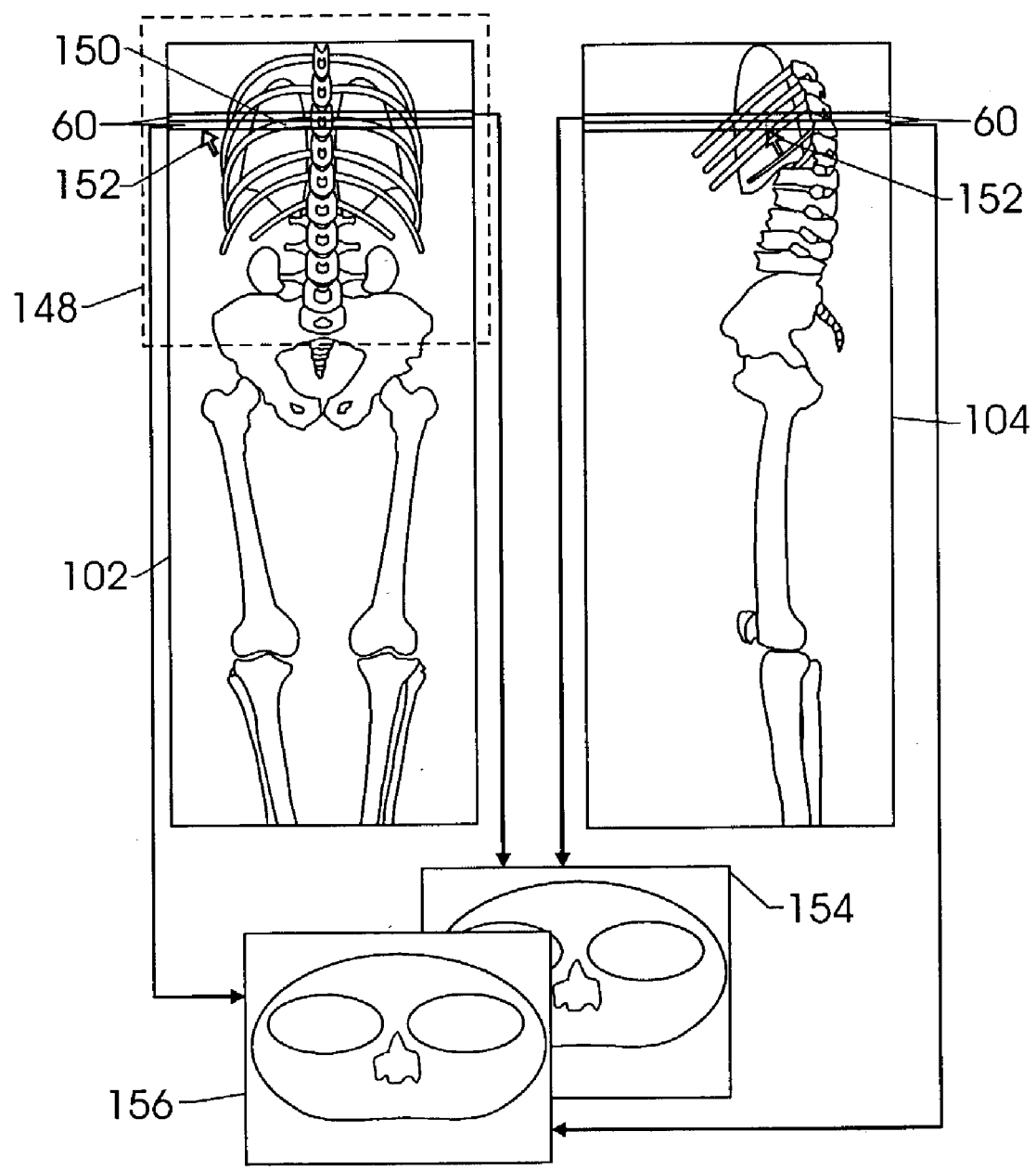
FIG. 7 is a representation of exemplary scout images and related detailed images generated in accordance with the present technique.

The scout images can be viewed and navigated in several possible manners. For example, in a computer workstation, one or more of the images may be viewed in thumbnail or other format. As the user becomes interested in additional detail in the images, only a portion of one or more of the scout images may be viewable in the available display area of the workstation. As illustrated in FIG. 7, for example, scout images generated based upon certain of the algorithms summarized above are shown for coronal and sagittal views. Again, each pixel in each of the views corresponds to filtered values for aligned pixels in each of the related images from which the scout images are derived. Moreover, where slices are transverse to the direction of projection of each of the scout images, each row of each scout image may correspond to a separate image from the set of images. In the case of the coronal scout image 102, for example, a viewing area 148 may be defined which corresponds to the available display area on a viewer workstation. Particular features of interest, as indicated generally at reference numeral 150, may be seen in the scout image or images, or may be believed to exist due to the location discernible from the scout images.

As summarized at step 140 in FIG. 6, certain modifications may be made to the scout image, multiple scout images, or to the presentation of the related detailed images by appropriate tools provided in a user interface. As illustrated in FIG. 7, devices such as a cursor 152 may be used to point to specific features, and conventional tools, such as zooming tools (for altering spacial resolution of the presented image) may be used to zoom into such regions. Also, modification of the display may be made, such as for changing brightness levels, contrasts or even the underlying parameters used to display the scout images. Such tools may be provided in a conventional menu or toolbar (not shown). Such modifications may be made simply to the scout image, or may be translated into similar changes in the underlying images, such as to highlight specific features of interest. For example, changes in contrast or brightness may be made to render more visible such features as bone, vascular structure, organs, specific tissues, neural structures, and so forth in the medical diagnostic context.

At step 142 of FIG. 6, specific features of interest may be selected, such as via the cursor 152 shown in FIG. 7, to select one or more images or slices from the set of related images. In one exemplary implementation a single image is then downloaded from the repository and reconstructed for display. This step is indicated at reference numeral 144 in FIG. 6. Where desired, more than one image, such as within a default envelope or image range on either side of the selected location may be accessed for display through such selection. At step 146 in FIG. 6 the selected and accessed images are then displayed for review.

It should be noted that, referring to FIG. 7, the steps of navigating through the scout images, modifying images, selection of images, and access and display of images may be performed in any one or more of the scout images. For example, similar images may be accessed through reference to the coronal scout image 102 or to the sagittal scout image 104 illustrated in FIG. 7. From either view detail images 154 or 156 may be retrieved.

Figure 8:
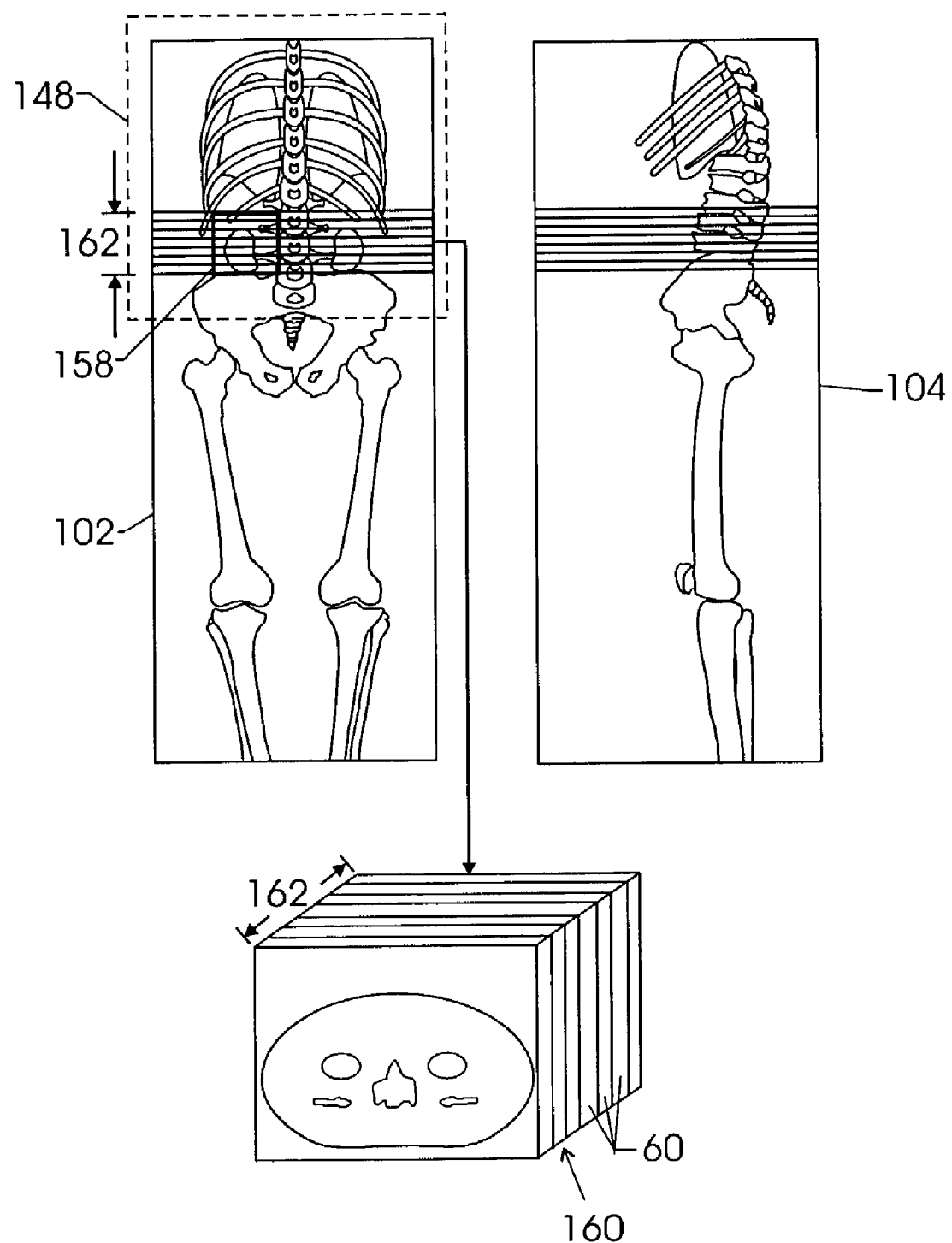
FIG. 8 is a representation of images similar to those shown in FIG. 7 illustrating a manner in which a series or set of related images may be selected from scout or navigational images.

In an alternative mode of operation, a tool may be provided for selecting a range of images of potential interest by reference to one or more scout images. FIG. 8 represents a selection window 158 which may be available for the user to outline a particular feature of interest, such as an organ or region of the body in the medical diagnostic context. Where desired, the selection window may be expandable and contractible to allow flexibility in selection of the range of detail images to be accessed. In a manner similar to that described above, the corresponding images are then accessed and retrieved for display based upon the selection. As also represented in FIG. 8, the resulting volume 160 defined by the selected images will generally have a length 162 corresponding to the number of individual images or slices 60 selected by the user. The user may then view individual images, cine through multiple images or use a conventional volume rendering tool to assemble a volume presentation of the various features within the selected volume 160.

As will be appreciated by those skilled in the art, the foregoing technique presents a number of distinct advantages both in terms of efficiencies in the time required to navigate to specific images, as well as in the use bandwidth for transmission of images of interest. For example, scout images may be generated and reconstructed in manners that accentuates specific features of interest, such as anatomies in the medical diagnostic context, and may be based upon specific protocols employed for specific types of analysis, such as angiography, and so forth. Timing of creation of the scouts, as mentioned above, may be coordinated with acquisition to provide real-time availability of the scout image, or may be delayed for subsequent processing. The use of secondary image capture techniques, particularly in DICOM formats facilitates both the referencing of the scout images and the cross-referencing of scout images and the related images from which the scout images are derived. The scout image also allows for effective movement through an entire large image series by simply navigating through (e.g. dragging a mouse or other input device along) a single navigational image. As mentioned above, the scout images also permit for targeted selection and export or transmission of individual images or sets of images by reference to the scout or navigational image. The ability to modify features such as contrast, brightness, special resolution, and so forth based upon the scout images enables the user to better view the features of interest, particularly anatomies in a medical diagnostic context.

While reference has been made to a workflow based upon generating and storing the scout or navigational image or images in a central repository such as a PACS, it should be noted that other workflows and image transmission models are available. For example, some or all of the features described above may be provided in a stand-alone imaging workstation. Similarly, certain of the features may be provided in the imaging systems themselves, such as in the medical imaging control systems of CT, MRI, and other systems. The images may also be provided in a network or web-based workflow context so as to provide interfacing by referring physicians, diagnosing physicians, and others in a teleradiology system.

Moreover, other and more enhanced processing than that described above may be envisaged based upon aspects of the present technique. For example, where images acquired at different times are available, four-dimensional scouts (including a time-element) may be generated. Such images may be used for comparison purposes, visualization of function, movement of objects, movement of tissues, functional analyses, and so forth. Similarly, "thick slab" representations may be generated for the scout images or from the scout images based upon averaging techniques employing multiple slices or individual related images.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A method for processing a series of images comprising:
accessing image data representative of a plurality of related images, the images representing separate slices through a subject;
deriving a navigational image depicting internal features of the subject by computing values for pixels of the navigational image that represent a projection of the related images in a desired direction based upon rows and columns of aligned pixels in each of the slices; and
storing the navigational image.

2. The method of claim 1, wherein the values of pixels of the navigational image are computed based upon characteristics of aligned pixels in each of the plurality of related images.

3. The method of claim 1, wherein the navigational image includes rows of pixels, each row corresponding to a respective individual image of the plurality of related images.

4. The method of claim 1, wherein the values for pixels of the navigational image are computed by averaging values of pixels aligned in a direction orthogonal the direction of projection of the navigational image.

5. The method of claim 1, wherein the values for pixels of the navigational image are computed based upon a maximum value of pixels aligned in a direction orthogonal a direction of projection of the navigational image.

6. The method of claim 1, wherein the values for pixels of the navigational image are computed based upon a minimum value of pixels aligned in a direction orthogonal a direction of projection of the navigational image.

7. The method of claim 1, wherein the values for the pixels of the navigational image are computed based upon features of interest viewable in the navigational image.

8. The method of claim 7, wherein the features of interest are anatomical features of a subject.

9. The method of claim 1, wherein the image data includes DICOM compliant data, and wherein the navigational image is stored as a secondary image capture along with the image data.

10. The method of claim 1, wherein the image data is generated by a medical imaging modality.

11. The method of claim 10, wherein the image data is generated by a computed tomography imaging system.

12. The method of claim 1, comprising deriving and storing multiple different navigational images for the plurality of related images.

13. The method of claim 12, wherein the multiple different navigational images include a coronal image and a sagittal image.

14. The method of claim 1, further comprising:
displaying the navigational image for a user;
receiving a selection from the user of a location on the navigational image; and
accessing and displaying at least one image of the plurality of related images based upon the selection.

15. The method of claim 1, further comprising:
displaying the navigational image for a user;
receiving a display preference from the user; and
modifying a display characteristic of at least the navigational image based upon the display preference.

16. The method of claim 15, wherein the display characteristic includes at least one of brightness, contrast, and spatial resolution.

17. The method of claim 15, comprising modifying a display characteristic of at least one of the plurality of related images based upon the display preference.

18. A navigational image generated via the method of claim 1.

19. A method for navigating through a series of images comprising:
accessing image data representative of a plurality of related images, the images representing separate slices through a subject;
deriving a navigational image that depicts internal features of the subject and that is a projection of the related images in a desired direction by computing a representative value for each pixel of the navigational image based upon characteristics of corresponding rows and columns of pixels aligned orthogonally to the desired direction in each of the plurality of related images; and
storing the navigational image.

20. The method of claim 19, wherein the navigational image includes rows of pixels, and wherein each row of the navigational image corresponds to a respective individual image of the plurality of related images.

21. The method of claim 19, wherein the value for each pixel of the navigational image is computed by averaging values of corresponding aligned pixels of a related image.

22. The method of claim 19, wherein the value for each pixel of the navigational image is set equal to a maximum value of corresponding aligned pixels of a related image.

23. The method of claim 19, wherein the value for each pixel of the navigational image is set equal to a minimum value of corresponding aligned pixels of a related image.

24. The method of claim 19, wherein the values for the pixels of the navigational image are computed based upon features of interest viewable in the navigational image.

25. The method of claim 24, wherein the features of interest are anatomical features of a subject.

26. The method of claim 19, wherein the image data includes DICOM compliant data, and wherein the navigational image is stored as a secondary image capture along with the image data.

27. The method of claim 19, wherein the image data is generated by a medical imaging modality.

28. The method of claim 27, wherein the image data is generated by a computed tomography imaging system.

29. A navigational image generated via the method of claim 19.

30. A method for navigating through a series of images comprising:
accessing image data representative of a plurality of related images, the images representing separate slices through a subject;
deriving a navigational image depicting internal features of the subject by computing representative values for pixels of the navigational image that represent a projection of the related images in a desired direction based upon rows and columns of aligned pixels in each of the slices;
storing the navigational image;
displaying the navigational image for a user;
receiving a selection from the user of a location on the navigational image; and
accessing and displaying at least one image of the plurality of related images based upon the selection.

31. The method of claim 30, further comprising:
receiving a display preference from the user; and
modifying a display characteristic of at least the navigational image based upon the display preference.

32. The method of claim 31, comprising modifying a display characteristic of at least one of the plurality of related images based upon the display preference.

33. The method of claim 30, comprising accessing and displaying a set of images from the plurality of related images based upon the selection.

34. The method of claim 30, wherein the values of pixels of the navigational image are computed based upon characteristics of aligned pixels in each of the plurality of related images.

35. The method of claim 30, wherein the navigational image includes rows of pixels, each row corresponding to a respective individual image of the plurality of related images.

36. The method of claim 30, wherein the values for pixels of the navigational image are computed by averaging values of pixels aligned in a direction orthogonal the direction of projection of the navigational image.

37. The method of claim 30, wherein the values for pixels of the navigational image are computed based upon a maximum value of pixels aligned in a direction orthogonal a direction of projection of the navigational image.

38. The method of claim 30, wherein the values for pixels of the navigational image are computed based upon a minimum value of pixels aligned in a direction orthogonal a direction of projection of the navigational image.

39. The method of claim 30, wherein the values for the pixels of the navigational image are computed based upon features of interest viewable in the navigational image.

40. The method of claim 39, wherein the features of interest are anatomical features of a subject.

41. The method of claim 30, wherein the image data includes DICOM compliant data, and wherein the navigational image is stored as a secondary image capture along with the image data.

42. The method of claim 30, wherein the image data is generated by a medical imaging modality.

43. The method of claim 42, wherein the image data is generated by a computed tomography imaging system.

44. A navigational image generated via the method of claim 30.

45. A system for processing a series of related images, the system comprising:
a repository for storing data representative of a series of related images, the images representing separate slices through a subject;
a processing module configured to compute pixel values for a navigational image that depicts internal features of the subject and that represents a projection of the related images in a desired direction based upon rows and columns of aligned pixels in each of the slices; and
a repository for storing the navigational image.

46. The system of claim 45, further comprising a workstation for viewing the navigational image, and a server for transferring the navigational image to the workstation for viewing.

47. The system of claim 46, wherein the server is configured to transmit at least one of the related images to the workstation based upon a user selection received at the workstation.

48. A system for processing a series of images comprising:
   means for accessing image data representative of a plurality of related images, the images representing separate slices through a subject;
   means for deriving a navigational image depicting internal features of the subject by computing values for pixels of the navigational image that represent a projection of the related images in a desired direction based upon rows and columns of aligned pixels in each of the slices; and
   means for storing the navigational image.

49. A system for navigating through a series of images comprising:
   means for accessing image data representative of a plurality of related images, the images representing separate slices through a subject;
   means for deriving a navigational image depicting internal features of the subject by computing a representative values for pixels of a navigational image that represent a projection of the related image in a desired direction based upon rows and columns of aligned pixels in each of the slices;
   means for storing the navigational image;
   means for displaying the navigational image for a user;
   means for receiving a selection from the user of a location on the navigational image; and
   means for accessing and displaying at least one image of the plurality of related images based upon the selection.

50. A computer readable medium encoded with a computer program for performing the steps of: accessing image data representative of a plurality of related images, the images representing separate slices through a subject; deriving a navigational image depicting internal features of the subject by computing values for pixels of the navigational image that represent a projection of the related images in a desired direction direction based upon rows and columns of aligned pixels in each of the slices; and storing the navigational image.

51. A computer readable medium encoded with a computer program for performing the steps of: accessing image data representative of a plurality of related images, the images representing separate slices through a subject; deriving a navigational image that depicts internal features of the subject and that is a projection of the related images in a desired direction by computing a representative value for each pixel of the navigational image based upon characteristics of corresponding rows and columns of pixels aligned orthogonally to the desired direction in each of the plurality of related images; and storing the navigational image.

* * * * *

UNITED STATES PATENT AND TRADEMARK OFFICE
CERTIFICATE OF CORRECTION

PATENT NO.       : 7,212,661 B2                                      Page 1 of 1
APPLICATION NO. : 10/367421
DATED            : May 1, 2007
INVENTOR(S)      : Yaseen Samara et al.

It is certified that error appears in the above-identified patent and that said Letters Patent is hereby corrected as shown below:

On the Title Page Item (75)
The spelling of the second inventor's name, Prakash Parayll Mathew is corrected to read -- Prakash Parayil Mathew --.

Signed and Sealed this

Fourth Day of December, 2007

JON W. DUDAS
*Director of the United States Patent and Trademark Office*